US006659350B2

(12) United States Patent
Schwartz et al.

(10) Patent No.: US 6,659,350 B2
(45) Date of Patent: Dec. 9, 2003

(54) ADJUSTABLE ILLUMINATION SYSTEM FOR A BARCODE SCANNER

(75) Inventors: Eric D. Schwartz, Skaneateles, NY (US); Edward B. Hubben, Skaneateles, NY (US); Brian L. Jovanovski, Syracuse, NY (US); Vivian L. Hunter, Baldwinsville, NY (US); Melvin D. McCall, Homer, NY (US); Gerard F. Beckhusen, Liverpool, NY (US)

(73) Assignee: Hand Held Products, Skaneateles Falls, NY (US)

( * ) Notice: Subject to any disclaimer, the term of this patent is extended or adjusted under 35 U.S.C. 154(b) by 0 days.

(21) Appl. No.: 10/079,366

(22) Filed: Feb. 20, 2002

(65) Prior Publication Data

US 2002/0096566 A1 Jul. 25, 2002

Related U.S. Application Data

(63) Continuation of application No. 09/704,017, filed on Nov. 1, 2000, now Pat. No. 6,371,374.

(51) Int. Cl.⁷ .................................................. G06K 7/10
(52) U.S. Cl. ............................. 235/462.42; 235/462.43
(58) Field of Search .......................... 235/462.01, 462.2, 235/462.21, 462.32, 462.33, 462.43, 462.42, 462.23, 462.24, 462.06

(56) References Cited

U.S. PATENT DOCUMENTS

| 5,254,844 A | * 10/1993 | Krichever et al. ..... 235/462.33 |
| 5,473,149 A | 12/1995 | Miwa et al. |
| 5,621,203 A | 4/1997 | Swartz et al. |
| 5,656,805 A | 8/1997 | Plesko |
| 5,777,314 A | 7/1998 | Roustaei |
| 5,783,811 A | 7/1998 | Feng et al. |
| 5,811,784 A | 9/1998 | Tausch et al. |
| 5,814,803 A | 9/1998 | Olmstead et al. |
| 6,092,728 A | 7/2000 | Li et al. |
| 6,164,544 A | * 12/2000 | Schwartz et al. ...... 235/462.43 |
| 6,275,388 B1 | * 8/2001 | Hennick et al. ....... 235/462.43 |

FOREIGN PATENT DOCUMENTS

| DE | DT 24 45727 A1 | 4/1976 |
| EP | 0 431 831 A1 | 11/1990 |
| EP | 0 548 951 A2 | 12/1992 |
| EP | 0 905 537 A1 | 3/1999 |
| EP | 0 944 017 A2 | 9/1999 |
| WO | WO 99/41545 | 8/1999 |

* cited by examiner

Primary Examiner—Michael G. Lee
Assistant Examiner—Jamara Franklin
(74) Attorney, Agent, or Firm—Wall Marjama & Bilinski LLP

(57) ABSTRACT

These and other objects of the present invention are attained by apparatus for adjusting the position of a line of light in barcode space that includes a support frame having a rear housing containing a solid state imager and a pair of support arms extending forwardly from the front of the housing. An imaging lens is mounted between the arms for focusing an image of a target in barcode space upon the solid state imager along the optical axis of the imaging lens. Illuminating LEDs are mounted on either side of the imaging lens for illuminating the target. The illumination is passed through a pair of cylindrical lenses that are adjustably mounted upon the distal ends of the arm so that the light can be selectively positioned in barcode space.

35 Claims, 3 Drawing Sheets

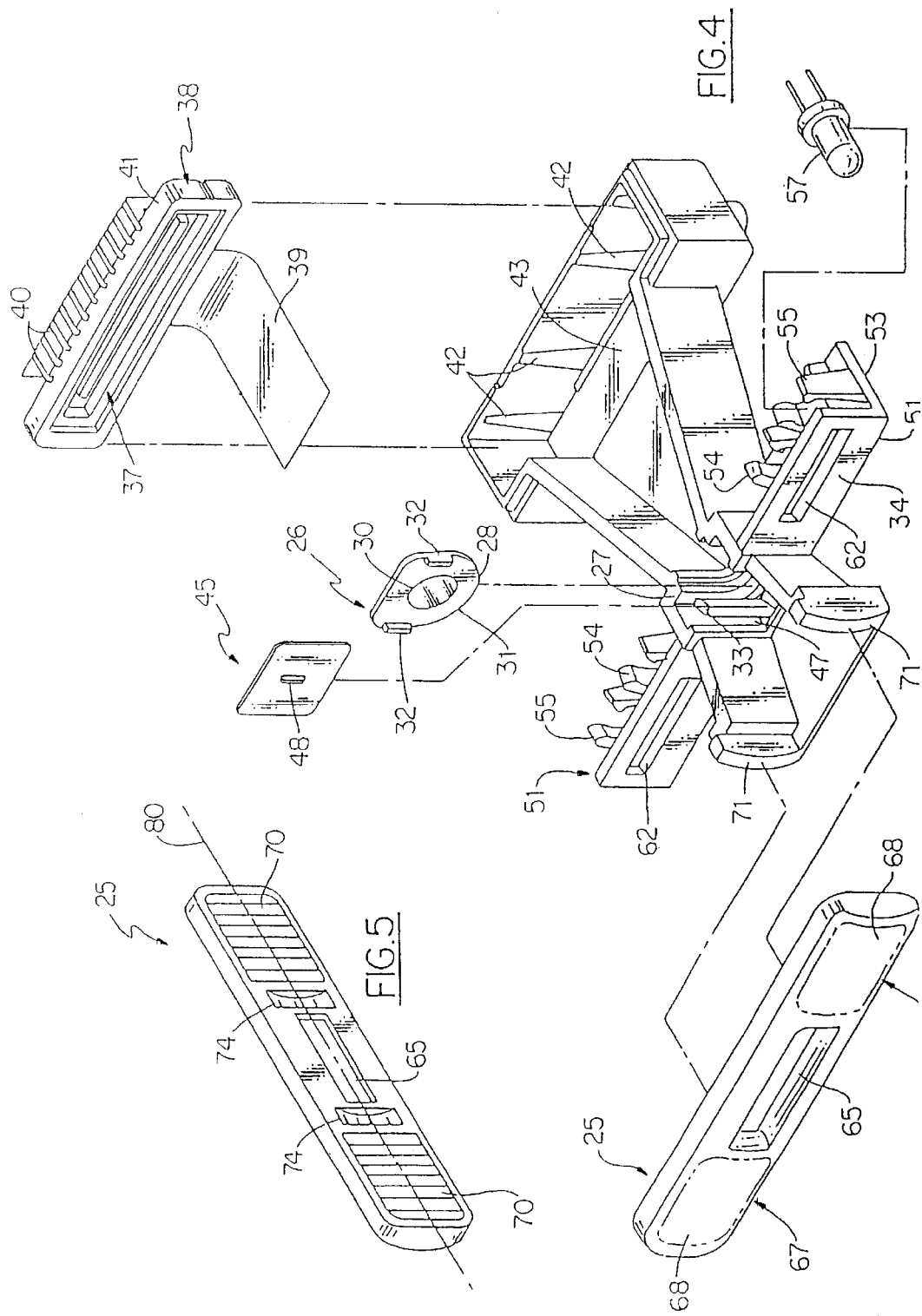

ADJUSTABLE ILLUMINATION SYSTEM FOR A BARCODE SCANNER

CROSS REFERENCE TO RELATED APPLICATION

This is a continuation application of U.S. Ser. No. 09/704, 017, filed Nov. 1, 2000 now U.S. Pat. No. 6,371,374 the entirety of which is incorporated herein by reference.

BACKGROUND OF THE INVENTION

This invention relates to an optical assembly for use in a barcode reader and, in particular, to an adjustable apparatus for positioning a sharp line of illuminator in barcode space.

Although the advantages associated with light emitting diodes (LEDs) when used in barcode scanning equipment are well known, the level of the intensity produced by this type of lamp is relatively low when compared to other light sources, such as halogen lamps or arc lamps. In an effort to improve the effectiveness of light emitting diodes in this application, it is sometimes customary to employ a relatively large number of lamps aligned in one or more rows above or below the imaging lens. As a result, the target region, as well as the periphery of the target region, are flooded with excessive light energy. This approach, however, is space consuming and poses certain assembly and alignment problems.

Optical units have also been devised for providing coplanar illumination wherein the light emitting diodes are mounted in the same plane as the imager on both sides of the imaging lens. Light from the light-emitting diodes is further passed through magnifying lens to project the light onto the barcode target. Additionally, diffusers are used in association with the LEDs to more uniformly distribute the light within the target area. Here again, these optical units overcome many of the problems associated with LED illumination systems. They nevertheless pose certain other problems relating to bringing the components together in assembly to provide compact, easy to install and adjust units suitable for use in a hand-held long range scanner.

SUMMARY OF THE INVENTION

It is, therefore, a primary object of the present invention to improve barcode readers.

A further object of the invention is to improve hand-held barcode scanners for long range illumination and reading of a barcode target.

A still further object of the present invention is to improve optical devices for use in barcode scanners which are capable of producing a sharply defined line of illumination in barcode space using light emitting diodes.

Another object of the present invention is to provide apparatus for positioning illumination within a desired location in barcode space.

These, and other objects of the present invention, are attained by an apparatus for adjusting the position of a line of light in barcode space that includes a support frame having a rear housing containing a solid state imager and a pair of support arms extending forwardly from the front of the housing. An imaging lens is mounted between the arms for focusing an image of a target in barcode space upon the solid state imager along the optical axis of the imaging lens. Illuminating LEDs are mounted on either side of the imaging lens for illuminating the target. The illumination is passed through a pair of cylindrical lenses that are adjustably mounted upon the distal ends of the arms so that the light can be selectively positioned in barcode space.

BRIEF DESCRIPTION OF THE DRAWINGS

For a better understanding of these and other objects of the present invention, reference will be made in the following detailed description of the invention, which is to be read in association with the accompanying drawings, wherein:

FIG. 4 is a slightly enlarged exploded view in perspective of the present optical assembly; and FIG. 5 is a perspective view showing the back of the half cylinder element.

DESCRIPTION OF THE INVENTION

Figure 1:
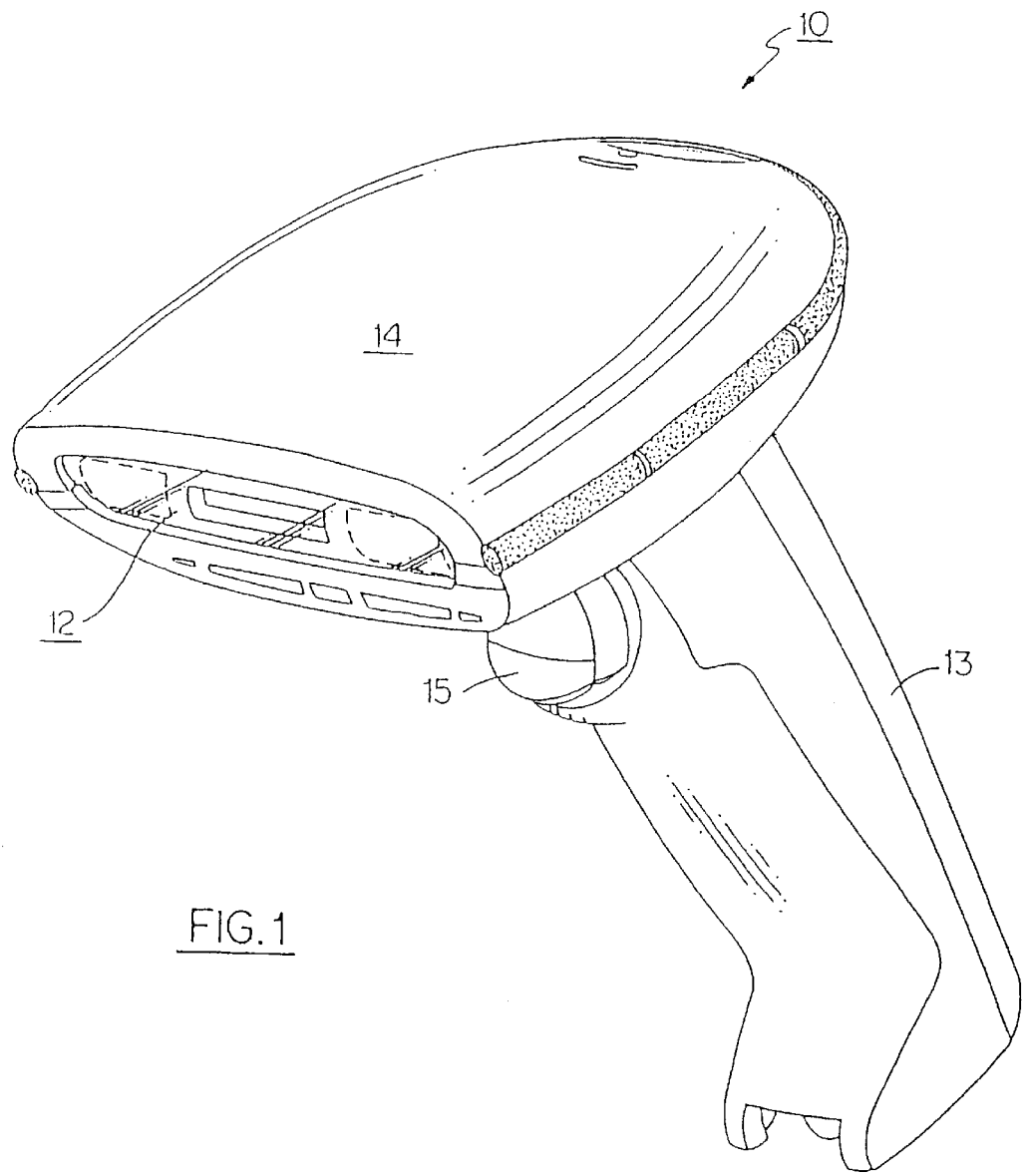
FIG. 1 is a perspective view of a hand-held barcode reader housing the optical assembly of the present invention.
Figure 2:
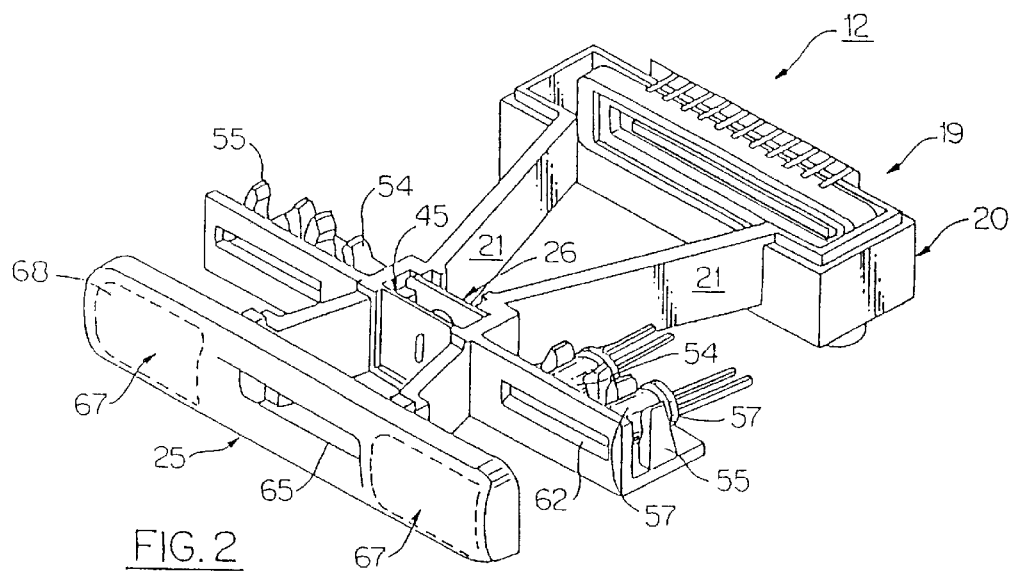
FIG. 2 is an enlarged perspective view showing the optical assembly encompassing the teachings of the present invention.

Turning initially to FIG. 1, there is shown a hand-held long-range barcode scanner 10 that houses the optical assembly 12 of the present invention. The scanner includes a handle 13 that can be easily grasped and held by the user so that the scanner can be rapidly trained upon a barcode target situated some distance from the user. The scanner further includes a contoured reader head 14 mounted on the top of the handle and a trigger 15 for activating the scanner. The scanner preferably is a light-weight, truly portable device that can be easily held and carried about without tiring the user. Accordingly, the reading components of the instrument must be compact, yet easily assembled, aligned and installed within the reader head. As will be explained in detail below, the apparatus of the present invention provides all these advantages while at the same time, delivering an extremely sharp, well-defined line of illumination in barcode space that can be accurately read by a solid state imager.

Figure 3:
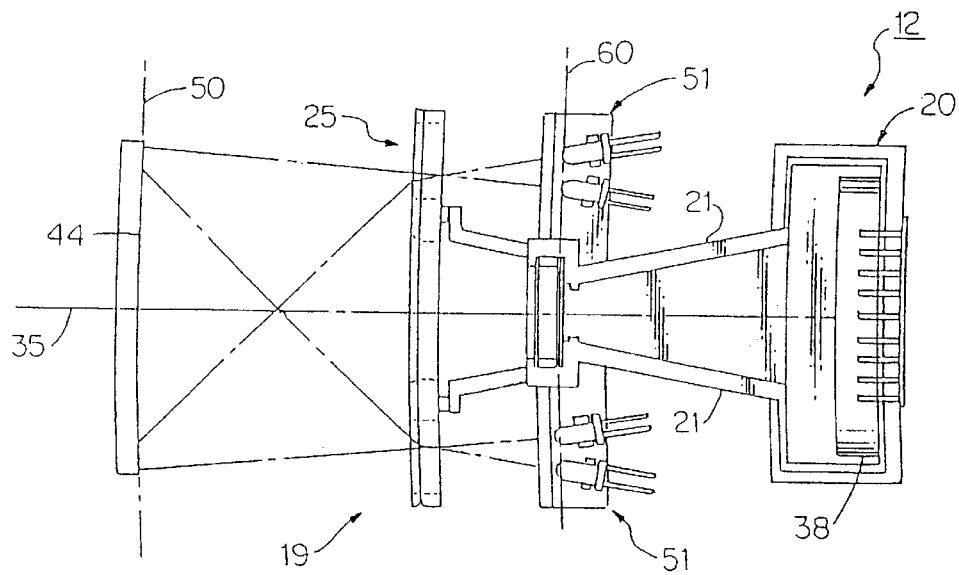
FIG. 3 is a top plan view of the optical assembly illustrated in FIG. 2.

With further reference to FIGS. 2–5, the optical assembly 12 embodying the teachings of the present invention includes a single piece frame 19 molded from high strength light-weight plastic. The frame further includes a rectangular-shaped housing 20 and a pair of forwardly extended arms 21—21. The arms, as viewed from above, in FIG. 3 are in an X configuration with an elongated optical element 25 mounted at the distal end of the arms, the function of which will be explained in greater detail below.

A lens card 26 (FIG. 4) is slidably received within a vertically disposed guideway 27 located at the neck formed by the arms. The lens card is molded from a single material and includes a flat lens each of 28 surrounding a single imaging lens 30. The bottom surface 31 of the holder is arcuate-shaped and adapted to seat within a complimentary groove situated in the bottom of the guideway. A pair of tabs 32—32 are carried on the front face of the lens holder each of which, in assembly, rests on the top surface of stanchions 33, the stanchions forming the front rails of the guideway. The tab serves to locate the imaging lens within the frame and prevents the lens card from being inserted into the frame in an inverted position.

Once properly mounted in the frame, the imaging lens defines the optical axis 35 (FIG. 2) of the system. A solid state image sensor or imager 37, which preferably is a charge coupled device (CCD), is mounted within a support 38 and is coupled to a flexible ribbon connector 39 by a series of leads 40 mounted along the top apron 41 of the support. The support is passed downwardly into the housing against locating ribs 42—42 molded into the back wall of the housing, and is seated upon the floor 43 of the housing. The solid state imager is aligned within the housing so that it is centered upon the optical axis of the system a given distance from the imaging lens so that an image of a target 44 in barcode space is focused upon the image recording surface of the imager by the imaging lens. A system for mounting an image sensor in an imaging device is described in detail in a copending application entitled "Image Sensor Mounting System" filed concurrently herewith, assigned to the Assignee of the present invention, and incorporated herein.

An aperture card 45 is slidably contained within a second guideway 47 positioned in front of the first guideway at the neck of the "X" shaped arms. The aperture card contains a vertically-extended stop aperture 48 that is centered upon the horizontal optical axis of the system. When the card is mounted in the guideway, the vertical orientated long dimension of the aperture is arranged so that the long dimension is parallel to the longer dimension of a one-dimensional (1D) barcode target situated in the object plane 50 of the imaging lens.

The terms horizontal and vertical are used herein with respect to relative locations of various components of the optical system and not necessary as to the exact location of the components in space.

A pair of lamp brackets 51—51 are mounted on either side of the frame at the neck. Each bracket is of similar construction and includes a platform 53 and a front wall 54. As best illustrated in FIG. 4 each platform has a pair of clips 54 and 55 mounted thereon that are perpendicularly aligned with the optical axis of the system. A light emitting diode (LED) 57 is mounted in each clip so that the distal end of each lamp lies substantially within the plane 60 (FIG. 3) described by the imaging lens to furnish the system with what is known as coplanar illumination.

The front wall 34 of each lamp bracket contains a horizontally disposed field stop 62 that is positioned immediately in front of the LEDs preferably almost in contact with the lamps.

The elongated optical element 25 mounted at the distal end of the frame arms is shown in greater detail in FIGS. 4 and 5. The optical element is formed of an elongated semi-circular shaped piece of optical glass having a rectangular-shaped opening 65 centrally formed therein. The opening is of a size and shape such that an image of a target in barcode space can freely pass optically undisturbed as it moves along the optical axis 35 of the system.

Cylindrical lens elements 67—67 are located on either side of the opening through which illumination from the LEDs pass. Each cylindrical lens images the associated field stop in barcode space to produce a sharp horizontal line of light at the target. A diffuser is mounted at the light entrance face of each illumination lens element. The diffuser can be either a gradient or a non-gradient diffuser. Preferably, a gradient diffuser is employed having 5° of diffusion at its outer edge and 40° of diffusion at its inner edge.

The LEDs mounted in the inboard clips 54 of each lamp bracket is canted at an angle with respect to the optical axis so that the light beam from the lamps is directed to one outer side edge of the target region. The lamps mounted in the outboard clips 55 are similarly canted to direct the light beams from the outboard lamps toward the center of the target region. The positioning of the lamps along with the use of a single axis diffuser and a field stop aperture severs to create a sharp uniform line of light across the barcode target that can be accurately recorded by the CCD imager.

As illustrated in FIG. 4, the distal end of each arm of the frame contains an arcuate shaped camming surface 71 that lies in a vertical plane that is parallel with the optical axis of the system. The camming surfaces are received in complimentary cut-outs 74 formed in the plano back surface of the optical element 25 with the cut-outs being centered upon the center line of 80 of the optical element 25. Preferably, each camming surface describes an arc of a circle about which the cylindrical illuminating lenses carried by the elongated optical element can be rotatably adjusted within a plane. The center of curvature of the camming surfaces are coincident with the center of curvature of the front surface 68 of the optical element 67. Accordingly, the illumination lenses can be rotatably adjusted so that the line of illumination that is produced is coincident with the object plane of the imaging lens. As can be seen, a slight rotation of the element along the camming surface will angularly offset the plano entrance face of the two illumination lens elements with respect to the axis of the incoming light beam, thus altering the position of the line of light produced in the plane of the barcode target. Accordingly, during assembly of the optical reader components on the frame, the line of illumination can be easily and accurately adjusted in barcode space. Once adjusted, the optical element is permanently held in place by ultrasonically welding the optical element to the frame. Any other means for holding the optical element 25 in a desired position within the frame may be similarly employed without departing from the teachings of the present invention.

One example of an optical assembly suitable for use in a barcode reader involves a single element plastic lens having a focal length of approximately 30 mm.

The lens is positioned approx 39 mm in front of a linear array CCD, so an image of a target in barcode space is formed at the image plane of the lens at a magnification of approx 1/3.5×. The aperture stop of the lens can be either elliptical or rectangular in shape, having an aspect ratio of at least 3:1 and preferably 6.0 or 8:1. The longer dimension of the aperture is oriented vertically, so the long dimension of the aperture is parallel to the longer dimension of a 1D barcode. The CCD of choice is a chip developed specifically for barcode reading, the photosensitive elements (pixels) having a 25:1 aspect ratio. Again, the longer dimension of the pixels will be aligned parallel to the barcode.

The illumination system consists of four LEDs in standard T 13/4 packages. Two LEDs will be arranged on either side of the imaging lens. The LEDs will lie in the same plane as the imaging lens, to provide coplanar illumination. In front of the LEDs, almost in contact with them is a field stop. The field stop is simply a horizontal slit having a height of about =0.040 to 0.050". The field stop is imaged into barcode space by a cylindrical lens having a focal length of about 25 mm. The magnification of the cylinder lens is approx 6×, so the result is a sharp horizontal line, 0.24" to 0.36" in height. Also included in the illumination system is a single axis diffuser, located in contact with the cylinder lens. This diffuser serves to homogenize the light in the horizontal plane, improving the uniformity of the distribution of the light.

While this invention has been explained with reference to the structure disclosed herein, it is not confined to the details set forth and this invention is intended to cover any modifications and changes as may come within the scope of the following claims:

What is claimed is:

1. Apparatus for adjusting the position of a line of light in barcode space that includes a support frame having a rear housing containing a solid state imager, an imaging lens supported in said frame for focusing an image of a target in barcode space along a linear optical axis, upon the solid state imager, an illumination means supported in said frame for projecting a line of light upon a target in barcode space, said illumination means including at least one cylindrical illumination lens element having a piano light entrance face that is mounted adjacent a light source, said light source being in coplanar alignment with said imaging lens and being perpendicular to said optical axis, and including a semi-circular light emitting face, a field stop aperture positioned between the light source and the illumination lens in relation to said light source so that the line of light can be selectively positioned in barcode space, said adjusting means further including an arcuate shape recess formed in said cylindrical lens that is arranged to ride in contact with at least one cam mounted in said frame.

2. The apparatus of claim 1, wherein said illumination means further includes said field stop aperture positioned between the light source and the illumination lens element for producing a line of light in barcode space.

3. The apparatus of claim 2, wherein said cylindrical lens element has a arcuate shaped recess formed therein that is arranged to ride in contact with a cam mounted upon said frame.

4. The apparatus of claim 1, wherein the arcuate shaped recess formed in the cylindrical lens element has a center of curvature that is coincidental with the center of curvature of the semi-circular light emitting face of the illumination lens element.

5. The apparatus of claim 1, wherein said light source further includes a plurality of light emitting diodes.

6. The apparatus of claim 1, wherein said illumination lens element further includes a single axis diffuser mounted at the piano light entrance face.

7. The apparatus as set forth in claim 2, wherein said optical element receiving surface is integral with said support frame.

8. Apparatus for adjusting the position of a line of light in barcode space that includes a support frame having a rear housing containing a solid state imager and a pair of arms extending forwardly from the housing, an imaging lens mounted between the arms for focusing an image of a target in barcode space along a linear optical path onto said solid state imager, illumination means mounted upon said frame containing a plurality of light emitting diodes located on either side of said imaging lens in coplanar alignment with said imaging lens and being perpendicular to said optical path for illuminating a target in barcode space, an elongated optical element that contains a pair of spaced apart cylindrical illumination lenses said illumination lenses being located on either side of the optical path between the light emitting diodes and the target, each illumination lens containing a rear piano light entrance surface and semi-circular light exit face, said optical element having a central opening that passes through said optical path wherein a light image of said target passes through said opening each of said arms contains an arcuate camming surface at a distal end that is adapted to ride in a complementary recess formed in the optical element, a field stop mounted between the said light emitting diodes and the optical element for producing a line of light in barcode space, and adjusting means for rotatably positioning said optical element about an axis to adjust the position of the line of light in barcode space.

9. The apparatus of claim 8, wherein said optical element contains a central opening for permitting a light image of said target moving along the optical path to pass therethrough.

10. The apparatus of claim 9, wherein the distal end of each arm contains an arcuate camming surface at its distal end, each camming surface being adapted to ride in a complementary recess formed in the optical element.

11. The apparatus of claim 8, whereby the arcuate shaped recess has a center of curvature that is coincidental with the center of curvature of the light exit face of the optical illumination element.

12. The apparatus of claim 11, wherein the camming surfaces each lie in a plane that is generally parallel with the optical path.

13. The apparatus of claim 12, that further includes means for securing the optical element to the frame arms in a desired position with respect to the optical path.

14. The apparatus of claim 13, wherein the means for securing the optical element to the frame arms includes one or more ultrasonic welds.

15. Apparatus for adjusting the position of a line of sight in barcode space that includes:

a support frame having a rear housing containing a solid state imager;

an imaging lens supported in said frame for focusing an image of a target in barcode space along a linear optical axis of the solid state imager;

an illumination means supported in said frame for projecting a line of light upon a target in barcode space;

said illumination means including at least one cylindrical illumination lens element having a light entrance face and a light emitting face;

an adjusting means for positioning said illumination lens in relation to said source so that the line of sight can be selectively positioned in barcode space;

said adjusting means including an optical element receiving surface for engagingly receiving said illumination lens in a plurality of relative positions during assembly; and means for securing said illumination lens to said optical element receiving surface after desired relative positions have been established.

16. The apparatus as set forth in claim 15, wherein said optical element receiving surface is attached to said support frame.

17. The apparatus as set forth in claim 15, wherein said illumination lens includes at least one recess for slidably receiving said optical element receiving surface.

18. The apparatus as set forth in claim 17, wherein said illumination lens includes a pair of spaced recesses formed therein.

19. The apparatus as set forth in claim 17, wherein both a boundary of said recess and said optical element receiving surface are curvilinear in form.

20. The apparatus as set forth in claim 19, wherein said curvilinear surfaces are circular in form and have a center curvature that is coincidental with the center curvature of said light emitting face of the illumination lens.

21. The apparatus as set forth in claim 15, wherein said means for securing is ultrasonic bonding.

22. The apparatus as set forth in claim 15, wherein said lens element light entrance face is planar in form.

23. The apparatus as set forth in claim 15, and including a field stop aperture positioned between the light source and illumination lens to produce a line of light in barcode space.

24. The apparatus as set forth in claim 15, wherein said light source includes a plurality of light emitting diodes.

25. The apparatus as set forth in claim 24, wherein said plurality of LEDs are disposed in a plane substantially normal to said linear optical axis.

26. Apparatus for adjusting the position of a line of light in barcode space that includes:

a support frame having a rear housing containing a solid state imager and a forwardly extending optical element mounting surface;

an imaging lens mounted on said support frame for focusing an image of a target in barcode space along a linear optical path onto said solid state imager;

illumination means mounted on each side of said linear optical path for illuminating a target in barcode space;

an elongated optical element that contains a pair of spaced cylindrical illumination lenses, said illumination lenses being located on either side of the optical path between the light source and the target, each illumination lens containing a light entrance face and a light exit face, said optical element being adapted to engage said optical element mounting surface in a plurality of relative positions during the assembly process;

a field stop mounted between said light source and said optical element so as to produce a line of light in barcode space; and adjusting means for selectively moving said optical element relative to said optical element mounting surface so as to obtain a desired position of the line of light in barcode space.

27. The apparatus as set forth in claim 26, and including means for securing said optical element to said optical element mounting surface.

28. The apparatus as set forth in claim 27, wherein said optical element includes a pair of spaced recesses formed therein.

29. The apparatus as set forth in claim 28, wherein the curvilinear forms are circular in form and have a center of curvature that is coincidental with a center of curvature of the light exit face of said optical element.

30. The apparatus as set forth in claim 27, wherein both a boundary of said recess and said optical element mounting surface is curvilinear in form.

31. The apparatus as set forth in claim 26, wherein said optical element includes at least one recess formed therein for slidably receiving said optical element mounting surface therein.

32. The apparatus as set forth in claim 26, wherein said securing means comprises ultrasonic bonding.

33. The apparatus as set forth in claim 26, wherein said optical element further includes a central opening that passes through the optical path and wherein a light image of said target passes through said opening.

34. The apparatus as set forth in claim 26, wherein said illumination means comprises a plurality of light emitting diodes.

35. The apparatus as set forth in claim 26, wherein said optical element mounting surface comprises a pair of arms extending forwardly on said frame with each arm having an optical element mounting surface thereon.

* * * * *

UNITED STATES PATENT AND TRADEMARK OFFICE
CERTIFICATE OF CORRECTION

PATENT NO. : 6,659,350 B2  Page 1 of 1
DATED : December 9, 2003
INVENTOR(S) : Eric D. Schwartz et al.

It is certified that error appears in the above-identified patent and that said Letters Patent is hereby corrected as shown below:

Column 5,
Line 7, after the phrase "element having a" please delete the word "piano" and replace with the word -- plano --.
Line 35, after the word "at the" please delete the word "piano" and replace with the word -- plano --.
Line 57, after the phrase "containing a rear" please delete the word "piano" and replace with the word -- plano --.

Signed and Sealed this

Twenty-fourth Day of February, 2004

JON W. DUDAS
*Acting Director of the United States Patent and Trademark Office*